Figure 1:
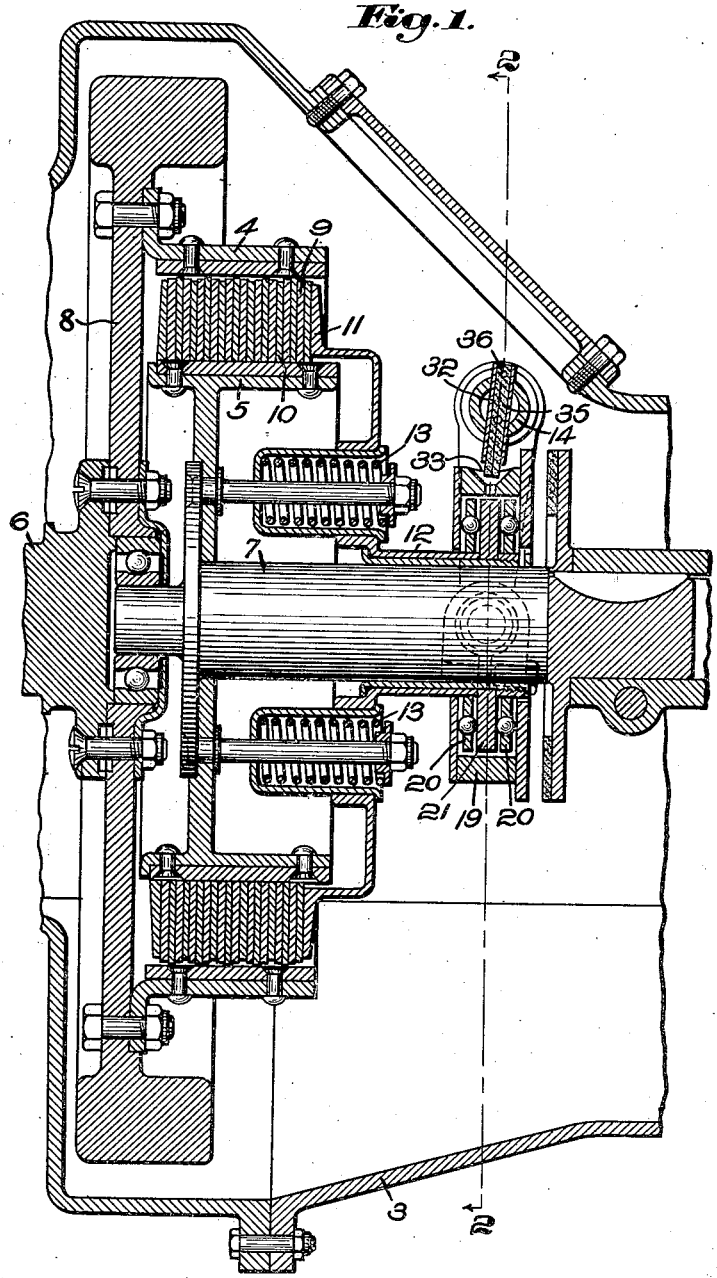

D. G. ROOS.
CLUTCH.
APPLICATION FILED AUG. 8, 1918.

1,424,036.

Patented July 25, 1922.
2 SHEETS—SHEET 1.

Inventor:
Delmar G. Roos.

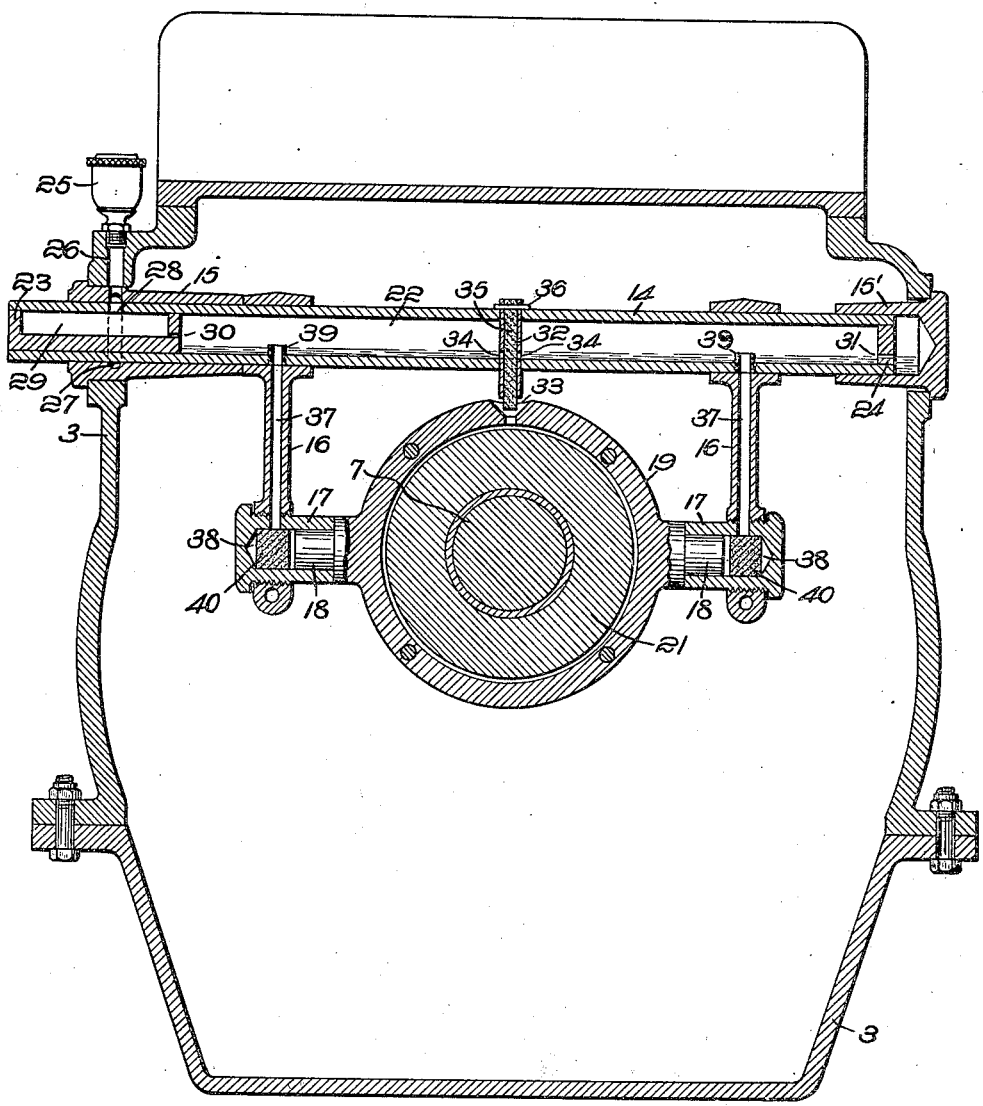

UNITED STATES PATENT OFFICE.

DELMAR G. ROOS, OF BRIDGEPORT, CONNECTICUT, ASSIGNOR, BY MESNE ASSIGNMENTS, TO THE LOCOMOBILE COMPANY, OF BRIDGEPORT, CONNECTICUT, A CORPORATION OF DELAWARE.

CLUTCH.

1,424,036.  Specification of Letters Patent.  Patented July 25, 1922.

Application filed August 8, 1918. Serial No. 248,878.

*To all whom it may concern:*

Be it known that I, DELMAR G. ROOS, a citizen of the United States, and a resident of Bridgeport, county of Fairfield, and State of Connecticut, have invented an Improvement in Clutches, of which the following description, in connection with the accompanying drawings is a specification, like characters on the drawings representing like parts.

This invention relates to clutches and is more particularly concerned with a system of lubrication for the bearing surfaces of the clutch-actuating rock-shaft, thrust-collar and thrust bearings of friction clutches of the class commonly used in motor vehicles for the transmission of power from the engine to the driving wheels. My invention will be best understood by reference to the following description when taken in connection with the accompanying drawings of one specific embodiment thereof, while its scope will be more particularly pointed out in the appended claims.

In the drawings:—

Figure 1 is a vertical longitudinal section of a clutch embodying my invention; and Fig. 2 is a sectional view on line 2—2 of Fig. 1.

Referring to the drawings and to the embodiment of my invention which is illustrated therein, I have shown for purposes of exemplification a common form of clutch having a housing 3 which encloses the mechanism, the latter including driving and driven members 4 and 5, one connected to a driving shaft 6 and the other to a driven shaft 7. In the embodiment shown the driving shaft 6 is the crank shaft of an internal combustion engine and carries a usual fly wheel 8 to which the driving member 4 is secured. While my invention is by no means limited as to the type of clutch with which it may be employed, I have herein shown what is known as a multiple disk clutch having two sets of friction disks 9 and 10, one carried by the driving member 4 and the other by the driven member 5, frictional engagement being effected by a member 11 having a hub or sleeve 12 mounted to slide axially on the driven shaft 7. The pressure necessary for the engagement of the clutch is furnished by a plurality of usual springs 13.

Disengagement of the clutch is effected by a rock-shaft 14 mounted in bearings 15 and 15' and having a pair of arms 16 provided with bearings 17 for a pair of trunnions 18, the latter being formed on a thrust collar 19. This collar carries a thrust bearing which may be of any usual or desired construction, the same herein comprising two sets of ball thrust washers 20 between which is a ring 21, the latter being secured to the hub 12. By rocking the shaft 14 in the proper direction, its arms 16 carry the thrust collar 19 axially toward the right in Fig. 1, thereby relieving the disks 9 and 10 of the pressure of the springs 13. Reengagement is effected by simply releasing the rock shaft and allowing the springs to reassert themselves and urge the member 11 toward the left in Fig. 1.

Clutch mechanisms of this class come into use very frequently during the operation of a motor car and the parts should be plentifully supplied with lubrication to prevent excessive wear. It is common to lubricate the thrust bearing by the use of a grease cup which it is necessary to turn from time to time to feed the grease to the bearing surfaces. When the grease cup is turned, a small quantity of grease is forced out and carried to the bearing surfaces, but it is evident that when this small supply of grease is used up, the bearing will run dry unless the grease cup is again turned. This is very apt to be neglected by motor car users and to remedy this difficulty I have provided a lubricating system employing oil contained in a reservoir from which the oil is fed in a most economical and yet efficient manner and without requiring frequent attention on the part of the user, it being possible to provide a supply of oil which will last several hundred miles. One convenient way of providing a reservoir is to form the rock-shaft 14 with a longitudinal chamber 22. For convenience in manufacture this may be done by making the rock-shaft of a piece of steel tubing having plugs 23 and 24 tightly fitted into its ends. The chamber between these plugs forms a reservoir of considerable capacity. The lubricating oil may be introduced into this chamber in various ways, but I prefer to employ an oil cup 25 mounted on the housing 3 and delivering oil through a passage 26 in the latter. This passage leads into and through the bearing 15, and preferably as a means for furnishing oil to the bearing I provide the latter with an internal groove 27 encircling the shaft 14 and receiving oil from the passage 26.

In order that the oil may be introduced into the chambered shaft 14, the latter is herein provided with an opening 28 registering with the circumferential groove 27. By introducing a supply of oil through the oil cup 25, some of the oil is fed to the bearing 15 while the remainder passes on into the chamber 22.

In order to prevent overfilling of the reservoir I have provided means for measuring the supply of oil which is introduced thereinto. A very simple and convenient way of accomplishing this is to provide the plug 23 with a chamber 29 having communication with the chamber 22 through a restricted opening 30 of such area, as compared with the passage 26, that when the oil cup 25 is opened and filled the oil cannot escape through the restricted passage 30 as fast as it is supplied to the oil cup and the latter will tend to overflow. The user then discontinues pouring oil and closes the oil cup, whereupon the supply of oil will gravitate through the opening 30 into the chamber 22 and an oil level will be established therein.

Oil may be supplied from the reservoir to the bearing 15' in any appropriate way, but in the present example I have provided the plug 24 with a restricted opening 31 at a height near the oil level in the reservoir, so that as the oil slops to and fro during the motion of the car a small quantity of oil will escape through the restricted opening 31 into the bearing 15', thus lubricating the latter.

The thrust bearing requires a constant but not large supply of oil. One convenient and reliable way of supplying oil from the reservoir to the bearing is to provide a conduit 32 communicating with the chamber 22 and depending therefrom in the direction of the thrust collar 19. It is not necessary that there shall be an actual connection between the depending tube and the thrust collar, and in fact such connection is not desirable because there is a relative swinging movement between these parts which would require some sort of flexible connection. I have therefore provided the thrust collar with an opening 33 leading to the interior thereof and of such size and shape as to receive the oil in any relative position of the parts. To this end the opening is herein funnel-shaped, as clearly shown in the drawings.

Instead of terminating the tube 32 within the shaft 14, I prefer to extend the same diametrically therethrough and to provide one or more, herein two, lateral openings 34 affording communication between the reservoir and the interior of the tube. Too rapid feeding of the oil may be prevented by the use of a wick 35 introduced in the tube. Preferably this wick is extended beyond the lower end of the tube, as shown in the drawings. The tube and wick may be conveniently secured in place by the provision of a pin 36 extending through both and resting on the upper side of the shaft 14, as shown in Fig. 2.

The cooperating bearing surfaces of the trunnions 18 and trunnion bearings 17 may be supplied with oil from the reservoir by the provision of suitable conduits leading from the latter. For the sake of lightness and convenience of manufacture these conduits may be formed by drilling the arms 16 to provide passages 37 leading from the chamber 22 to chambers 38 provided in the trunnion bearings 17. In order to prevent too rapid feeding of the oil to the trunnions, I may provide standpipes 39 forming continuations of the passages 37 and prolonging the latter approximately to the normal level of the oil in the reservoir. When the motor car moves over the inequalities of the roadway, the body of oil in the reservoir will naturally change its level and slop about more or less, thus causing oil to be fed in small quantities into the standpipes and thence through the passages 37 to the chambers 38. As an additional precaution to prevent too rapid feeding of the oil, I may provide absorbent pads 40 of suitable material such as felt at any convenient points such as within the chambers 38.

It should now be evident that I have provided an oiling system which requires replenishment only at long intervals and which will feed the oil reliably and economically to all of the bearing surfaces without danger of waste on the one hand or inadequate lubrication on the other. The measuring device affords a convenient means of enabling the user to fill the reservoir to a proper level to assure feeding of the oil, without waste, without the necessity of providing gauges or other devices which must be watched during the operation of filling. The pouring of the oil is simply continued until the oil cup runs over and the latter is then closed.

Having thus described one embodiment of my invention, what I claim and desire by Letters Patent to secure is:—

1. In a clutch, the combination of a rotatable thrust member, a thrust collar, a thrust collar operating rock shaft, and thrust collar lubricating means including an oil reservoir and oil absorbing means interposed between said reservoir and said thrust collar.

2. In a clutch, the combination of a rotatable thrust member, a thrust collar, a thrust bearing, a thrust collar operating rock shaft, and thrust collar lubricating means including an oil reservoir and oil absorbing means interposed between said reservoir and said thrust bearing.

3. In an oiling system for clutches, the combination with clutch-operating mechanism, having an oil reservoir supplying oil to the bearing surfaces, and an oil-measuring chamber having an oil inlet and a relatively restricted oil outlet leading to said reservoir.

4. In a clutch, the combination of a rotatable thrust member, a thrust collar, a thrust bearing carried thereby, a thrust collar actuating shaft provided with a reservoir, a conduit for feeding oil from said reservoir to said thrust bearing, pivots carried by said thrust collar, and arms carried by said shaft and carrying said pivots, said arms being provided with conduits for feeding oil from said reservoir to said pivots, said conduits leading from said reservoir above the bottom of the latter.

5. In a clutch, the combination of a rotatable thrust member, a thrust collar, a thrust bearing carried thereby, a thrust collar actuating shaft provided with a reservoir, a conduit for feeding oil from said reservoir to said thrust bearing, pivots carried by said thrust collar, and arms carried by said shaft and carrying said pivots, said arms being provided with conduits for feeding oil from said reservoir to said pivots, said conduits comprising stand-pipes having inlets within and above the bottom of said reservoir.

6. In a clutch, the combination of mechanism including a clutch-operating rock-shaft, said mechanism being provided with an oiling system including a reservoir carried by said rock-shaft, extraneous to the parts to be lubricated, and means for utilizing capillary action to feed oil from said reservoir to bearing surfaces of said mechanism.

7. In a clutch, the combination of mechanism including a clutch-operating rock-shaft, said mechanism being provided with an oiling system including a reservoir carried by said rock-shaft above the parts to be lubricated, and means for utilizing gravity and capillary action to feed oil from said reservoir to bearing surfaces of said mechanism.

8. In a clutch, the combination of mechanism including a clutch-operating rock-shaft, said mechanism being provided with an oiling system including a reservoir carried by said rock-shaft above the parts to be lubricated, and means for utilizing gravity, capillary action and motion of said reservoir to feed oil from said reservoir to bearing surfaces of said mechanism.

9. In a clutch, the combination of mechanism including a clutch-operating rock-shaft, said mechanism being provided with an oiling system including a reservoir carried by said rock-shaft, and a conduit leading from said reservoir and having an outlet depending above bearing surfaces of said mechanism and delivering oil thereto, said conduit having means to prevent too rapid feeding of the oil.

In testimony whereof, I have signed my name to this specification.

DELMAR G. ROOS.